(12) United States Patent
Savalle et al.

(10) Patent No.: US 11,212,079 B2
(45) Date of Patent: Dec. 28, 2021

(54) SEAMLESS ROTATION OF KEYS FOR DATA ANALYTICS AND MACHINE LEARNING ON ENCRYPTED DATA

(71) Applicant: Cisco Technology, Inc., San Jose, CA (US)

(72) Inventors: Pierre-André Savalle, Rueil-Malmaison (FR); Jean-Philippe Vasseur, Saint Martin d'uriage (FR); Alexandre Honoré, Schaerbeek (BE); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 637 days.

(21) Appl. No.: 16/186,662

(22) Filed: Nov. 12, 2018

(65) Prior Publication Data

US 2020/0153616 A1 May 14, 2020

(51) Int. Cl.
| | |
|---|---|
| *H04L 9/08* | (2006.01) |
| *H04L 12/26* | (2006.01) |
| *H04L 29/08* | (2006.01) |
| *G06N 3/08* | (2006.01) |
| *H04L 9/32* | (2006.01) |

(Continued)

(52) U.S. Cl.
CPC ............ *H04L 9/0819* (2013.01); *G06N 3/08* (2013.01); *H04L 9/14* (2013.01); *H04L 9/3213* (2013.01); *H04L 43/08* (2013.01); *H04L 63/0421* (2013.01); *H04L 63/0428* (2013.01); *H04L 67/10* (2013.01); *H04L 67/16* (2013.01)

(58) Field of Classification Search
CPC ....... H04L 9/0819; H04L 43/08; H04L 67/10; H04L 67/16; H04L 9/3213; H04L 63/0428; H04L 9/14; H04L 63/0421; H04L 41/16; H04L 41/142; H04L 2209/80; H04L 2209/42; H04L 9/0891; H04L 63/06; H04L 63/0407; G06N 3/08; G06N 5/003; G06N 7/005; G06N 20/10; G06N 20/20

USPC ......................................................... 713/159
See application file for complete search history.

(56) References Cited

U.S. PATENT DOCUMENTS 9,037,870 B1 * 5/2015 Zheng ................. G06F 21/6218
  713/189
9,935,772 B1 4/2018 Madisetti et al.
(Continued)

*Primary Examiner* — Jason K Gee
*Assistant Examiner* — Sanchit K Sarker
(74) *Attorney, Agent, or Firm* — Behmke Innovation Group LLC; Kenneth J. Heywood; Jonathon P. Western

(57) ABSTRACT

In one embodiment, a network assurance service maintains a first set of telemetry data from the network anonymized using a first key regarding a plurality of network entities in a monitored network. The service receives a key rotation notification indicative of a key changeover from the first key to a second key for anonymization of a second set of telemetry data from the network. The service forms, during a key rotation time period associated with the key changeover, a mapped dataset by converting anonymized tokens in the second set of telemetry data into anonymized tokens in the first set of telemetry data. The service augments, during the key rotation time period, the first set of telemetry data with the mapped dataset. The service assesses, during the time period, performance of the network by applying a machine learning-based model to the first set of telemetry data augmented with the mapped dataset.

20 Claims, 10 Drawing Sheets

(51) Int. Cl.
    *H04L 29/06*     (2006.01)
    *H04L 9/14*     (2006.01)

(56) References Cited

U.S. PATENT DOCUMENTS

| | | | |
|---|---|---|---|
| 10,044,693 | B1 | 8/2018 | Chudhary et al. |
| 2015/0193693 | A1* | 7/2015 | Vasseur ............... H04L 63/1425 706/12 |
| 2015/0310221 | A1* | 10/2015 | Lietz .................. H04L 9/16 713/193 |
| 2016/0156671 | A1 | 6/2016 | Cabrera et al. |
| 2017/0126718 | A1* | 5/2017 | Baradaran ........... H04L 63/0281 |
| 2018/0260125 | A1 | 9/2018 | Botes et al. |
| 2019/0044963 | A1* | 2/2019 | Rajasekharan ....... H04W 12/67 |
| 2019/0108115 | A1* | 4/2019 | Gonen ................ G06F 11/3608 |

* cited by examiner

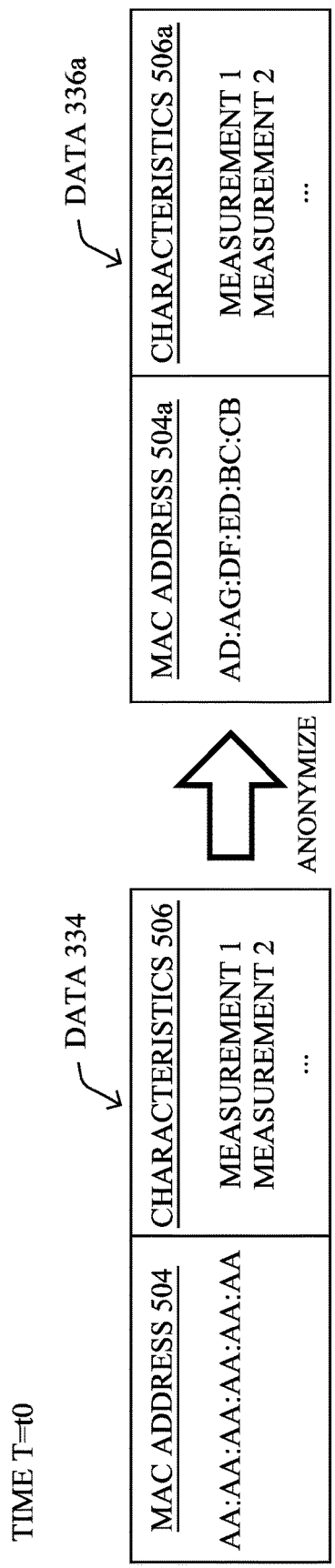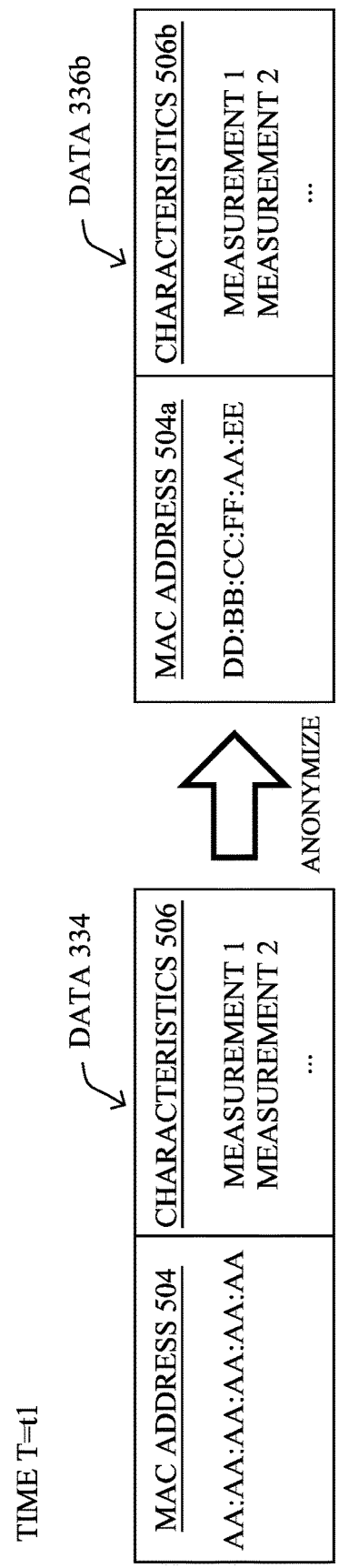
FIG. 5A
FIG. 5B

US 11,212,079 B2

SEAMLESS ROTATION OF KEYS FOR DATA ANALYTICS AND MACHINE LEARNING ON ENCRYPTED DATA

TECHNICAL FIELD

The present disclosure relates generally to computer networks, and, more particularly, to the seamless rotation of keys for data analytics and machine learning on encrypted data.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5C illustrate examples of anonymized telemetry data;

DESCRIPTION OF EXAMPLE EMBODIMENTS

Overview

Figure 1A:
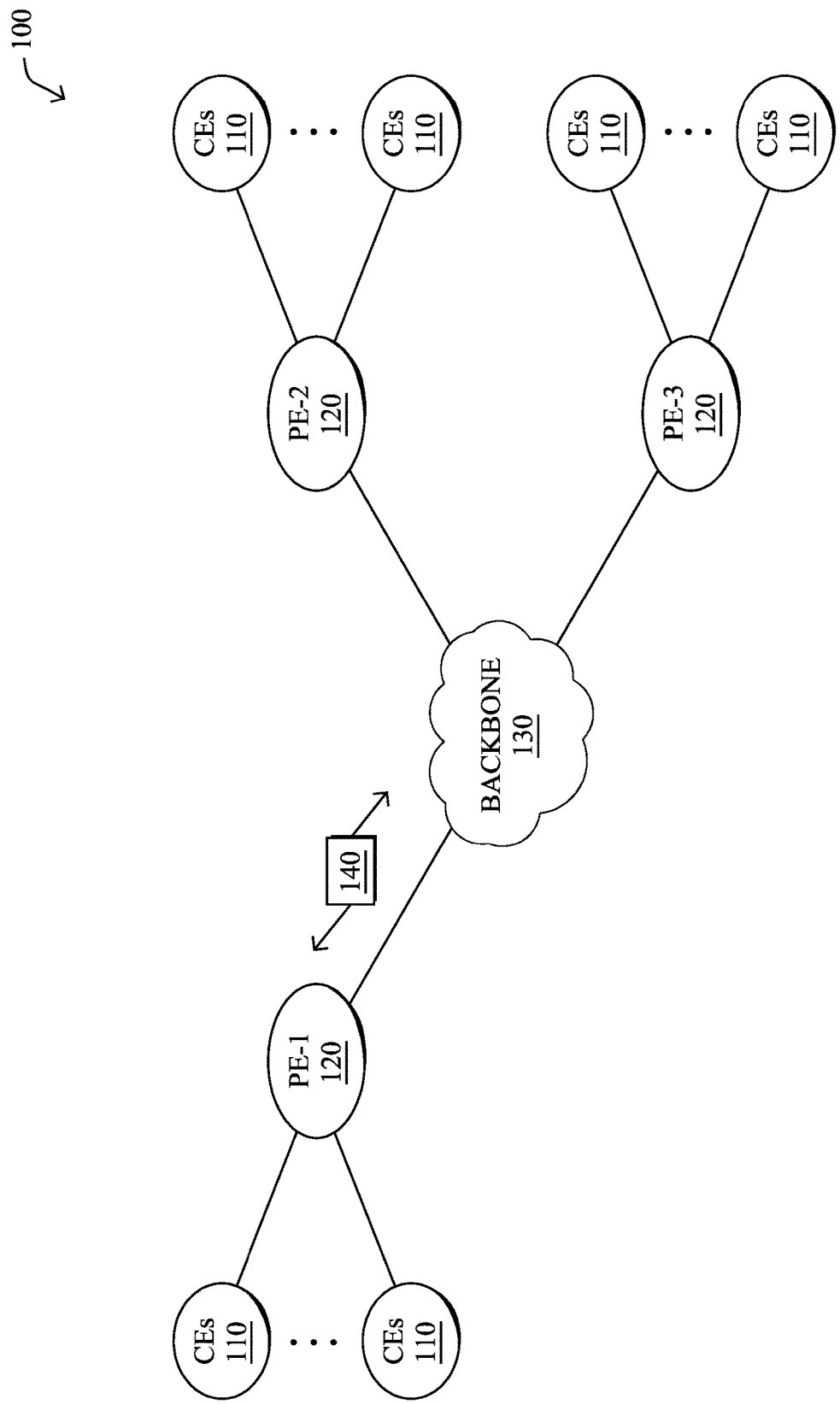
FIGS. 1A-1B illustrate an example communication network.

According to one or more embodiments of the disclosure, a network assurance service that monitors a network maintains a first set of telemetry data from the network anonymized using a first key regarding a plurality of network entities in the network. The service applies a machine learning-based model to the first set of telemetry data to assess performance of the network. The service receives a key rotation notification indicative of a key changeover from the first key to a second key for anonymization of a second set of telemetry data from the network. The service forms, during a key rotation time period associated with the key changeover, a mapped dataset by converting anonymized tokens in the second set of telemetry data into anonymized tokens in the first set of telemetry data. The service augments, during the key rotation time period, the first set of telemetry data with the mapped dataset. The service assesses, during the key rotation time period, performance of the network by applying the machine learning-based model to the first set of telemetry data augmented with the mapped dataset.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
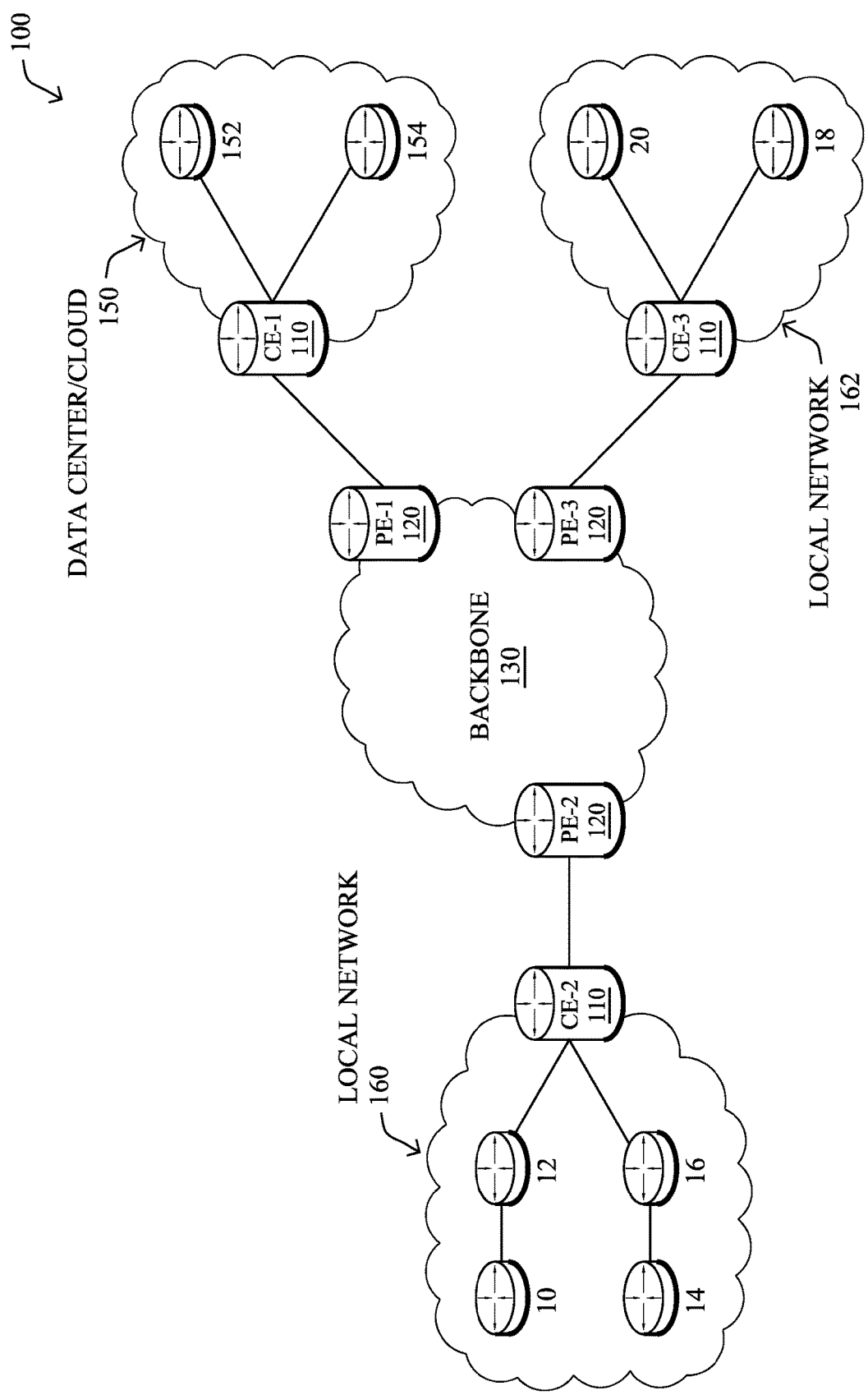

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
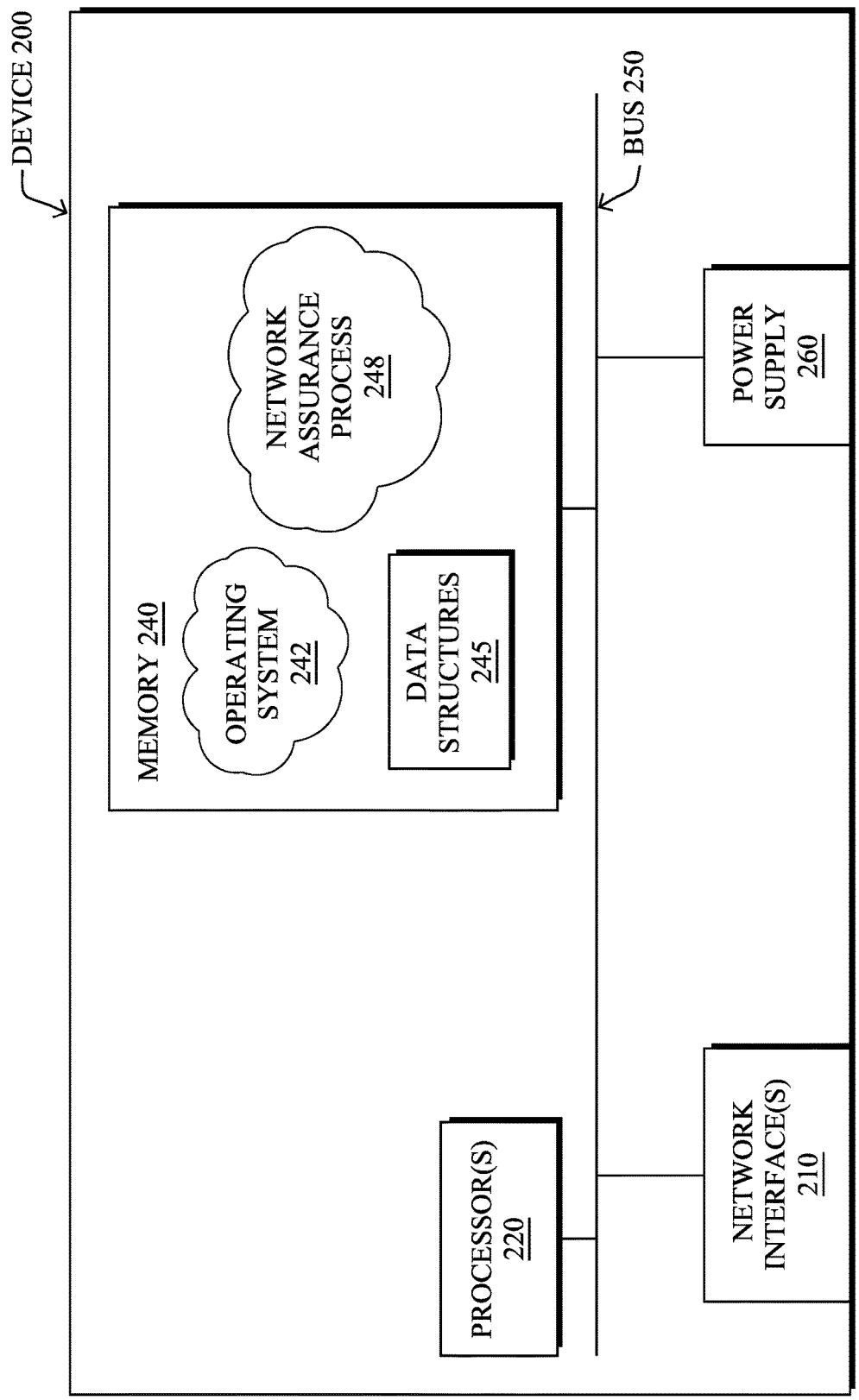
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless AP controller may send a reason code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
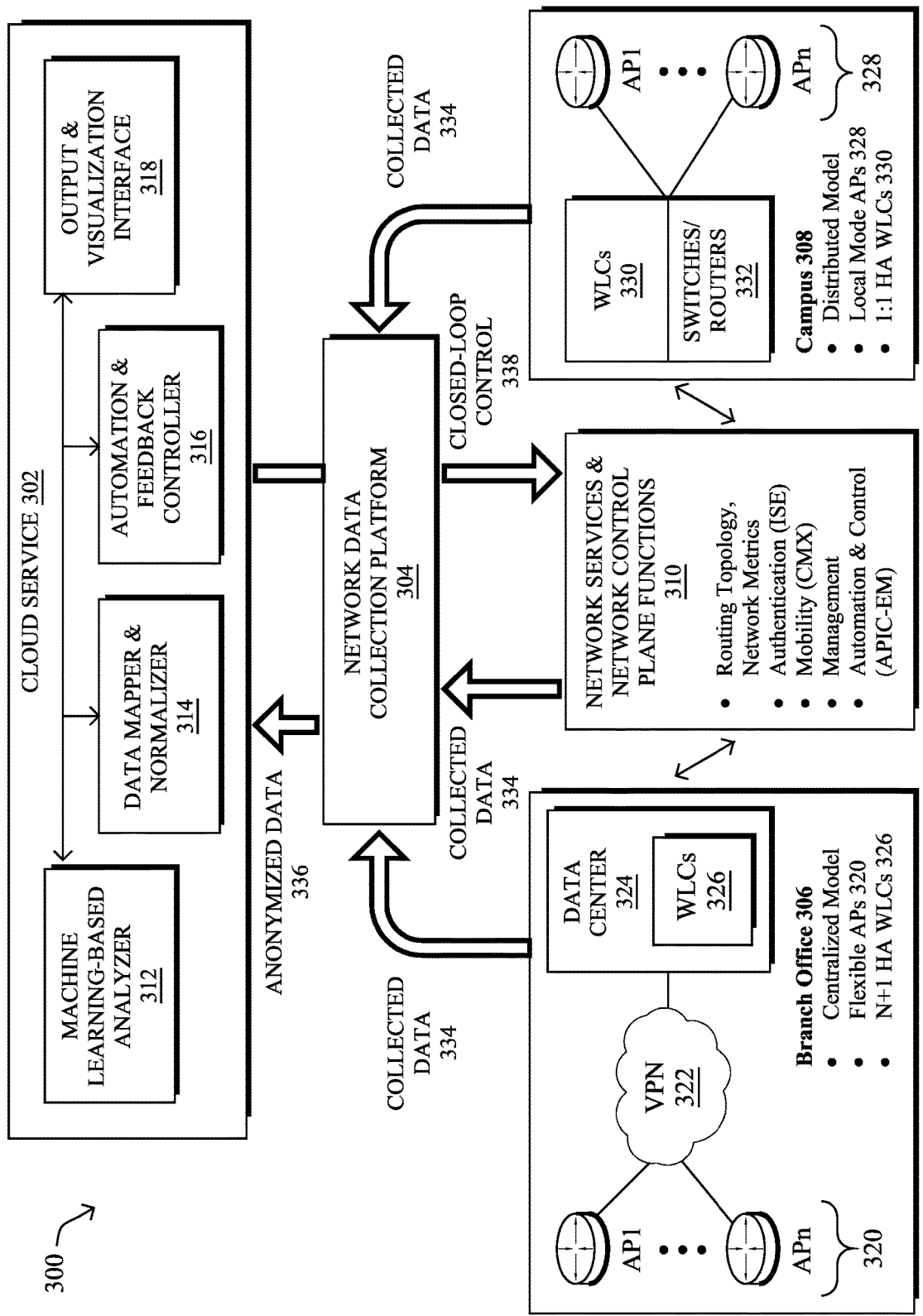
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 (e.g., supervisory controllers that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, data privacy in a network assurance system is an important consideration when sending telemetry to the cloud or other remote services. A lack of strong privacy protection could be a show-stopper for many potential users of the service and may not be compliant with privacy regulations such as the General Data Privacy Regulation (GDPR) in the European Union. To alleviate these risks and concerns, a network assurance service can be constructed to consume only data that has been anonymized.

Despite the benefits of anonymizing the telemetry data from a monitored network, doing so also presents a technical challenge from a machine learning standpoint. Notably, anonymization of telemetry data may entail encrypting tokens in the telemetry data such as IP addresses, MAC addresses, or the like, prior to sending the data to the network assurance service for assessment. This means that a change to the encryption key used to anonymize the data will effectively reset the incoming data to the service, as the telemetry data will appear to be regarding a different device, from the perspective of the network assurance service. However, many machine learning-based models rely on a history of incoming data, to function. For example, in the case of anomaly detection using unsupervised learning, the anomaly detection model may look to the previous days, weeks, or months, to model the expected behavior.

Seamless Rotation of Keys for Data Analytics and Machine Learning of Encrypted Data The techniques herein introduce a mechanism that allows most cloud data collection platforms to support the rotation of encryption keys used to anonymize data sent to the cloud for analysis, while also taking into account the machine learning and analytics pipelines of the cloud service. In some aspects, the techniques herein strike a balance between security and continuity of the monitoring operations, which may be particularly of value when medium or low priority key rotations need to be performed.

Specifically, according to one or more embodiments of the disclosure as described in detail below, a network assurance service that monitors a network maintains a first set of telemetry data from the network anonymized using a first key regarding a plurality of network entities in the network. The service applies a machine learning-based model to the first set of telemetry data to assess performance of the network. The service receives a key rotation notification indicative of a key changeover from the first key to a second key for anonymization of a second set of telemetry data from the network. The service forms, during a key rotation time period associated with the key changeover, a mapped dataset by converting anonymized tokens in the second set of telemetry data into anonymized tokens in the first set of telemetry data. The service augments, during the key rotation time period, the first set of telemetry data with the mapped dataset. The service assesses, during the key rotation time period, performance of the network by applying the machine learning-based model to the first set of telemetry data augmented with the mapped dataset.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
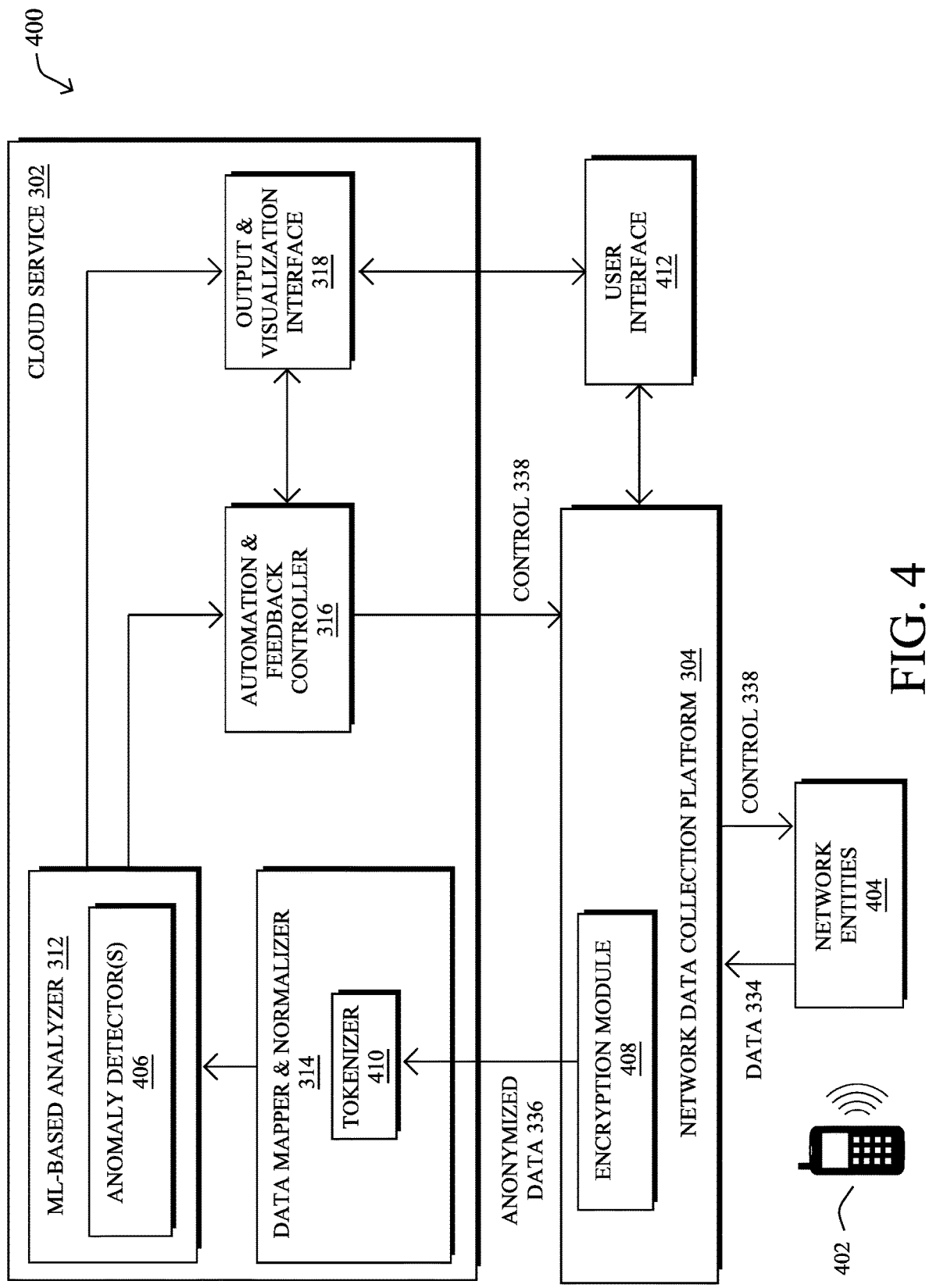
FIG. 4 illustrates an example architecture for rotating keys in a network assurance system.

Operationally, FIG. 4 illustrates an example architecture 400 for rotating keys in a network assurance system, according to various embodiments. At the core of architecture 400 may be the following components: one or more anomaly detectors 406, an encryption module 408, a tokenizer 410, and/or a user interface 412. In some implementations, the components 406-412 of architecture 400 may be implemented within a network assurance system, such as system 300 shown in FIG. 3. Accordingly, the components 406-412 of architecture 400 shown may be implemented as part of cloud service 302 (e.g., as part of machine learning-based analyzer 312 and/or output and visualization interface 318), as part of network data collection platform 304, and/or on one or more network elements/entities 404 that communicate with one or more client devices 402 within the monitored network itself. Further, these components 406-412 may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, service 302 may receive telemetry data from the monitored network (e.g., anonymized data 336) and, in turn, assess the data using one or more anomaly detectors 406. At the core of each anomaly detector 406 may be a corresponding anomaly detection model, such as an unsupervised learning-based model. When an anomaly detector 406 detects a network anomaly, output and visualization interface 318 may send an anomaly detection alert to a user interface 412 for review by a subject matter expert (SME), network administrator, or other user. Notably, an anomaly detector 406 may assess any number of different network behaviors captured by the telemetry data (e.g., number of wireless onboarding failures, onboarding times, DHCP failures, etc.) and, if the observed behavior differs from the modeled behavior by a threshold amount, the anomaly detector 406 may report the anomaly to user interface 412 via network anomaly, output and visualization interface 318.

Network data collection platform 304 may employ any number of approaches to anonymize the telemetry data 334 collected from network entities 404. One approach may be to replace all tokens by some opaque identifier (e.g., a numerical identifier) before sending them to cloud service 302. However, with this approach, service 302 would also need to maintain a lookup table from tokens to identifiers, which can be costly and slow, and constitutes a single point of failure. In addition, a token seen once only will still have to be stored forever. This is especially difficult when the scale is large, and the number of network entities 404 can be potentially very large (e.g., IP addresses, etc.).

An alternative anonymization approach would be to use a one-way function, to transform the token into an opaque identifier. For example, network data collection platform 304 could apply a hash function to data 334, to form anonymized data 336. With proper salting and enough bytes, this can be done securely and with close to no risk of collisions. However, this is a one-way process and this makes it impossible for a user interface deployed on-premise to get any kind of data from cloud service 302 that includes clear-text information. In particular, could service 302 would only know about the hashed identifier the hosts in the monitored network and there would be no way to recover the original token for further review.

Yet another data anonymization approach that is both "state-less" and reversible would be to encrypt tokens on-premises, using an encryption key that only the operator of the network knows. This does not require cloud service 302 to keep a potentially forever-growing state. In the realm of networking, sensitive tokens, such as IP addresses, MAC addresses, or usernames can be encrypted. Cloud service 302 would thus only see and store encrypted tokens, while only the operator of the network undergoing monitoring has the ability to reverse the encryption back to the clear-text tokens. Due to computational constraints at large scale, symmetric encryption is particularly well suited for this application and is the preferred approach to generating anonymized data 336.

In general, it is not a problem for ML-based analyzer 312 to work with encrypted tokens in the anonymized telemetry data 336 from a monitored network, so long as the encrypted tokens are not random. For example, if a given network entity 404 or client 402 is always mapped to the same encrypted token in data 336, most of the analytics operations performed by data mapper and normalizer 314, as well as analyzer 312, can be applied without any major change (e.g., joining and correlating data, etc.).

Changing the encryption key used to anonymize data 336 makes all further data sent to cloud service 302 after the key rotation "look new." In particular, all encrypted names of entities 404 and/or clients 402 will be different from previously seen encrypted names, thus making it impossible for service 302 to join or correlate the new data 336 with any past data 336. In practice, this is akin to starting fresh as if no data had been sent before. This is not possible for analytics and machine learning services and pipelines, which usually require a certain amount of history to produce proper metrics and learn meaningful statistic models.

Figure 5C:
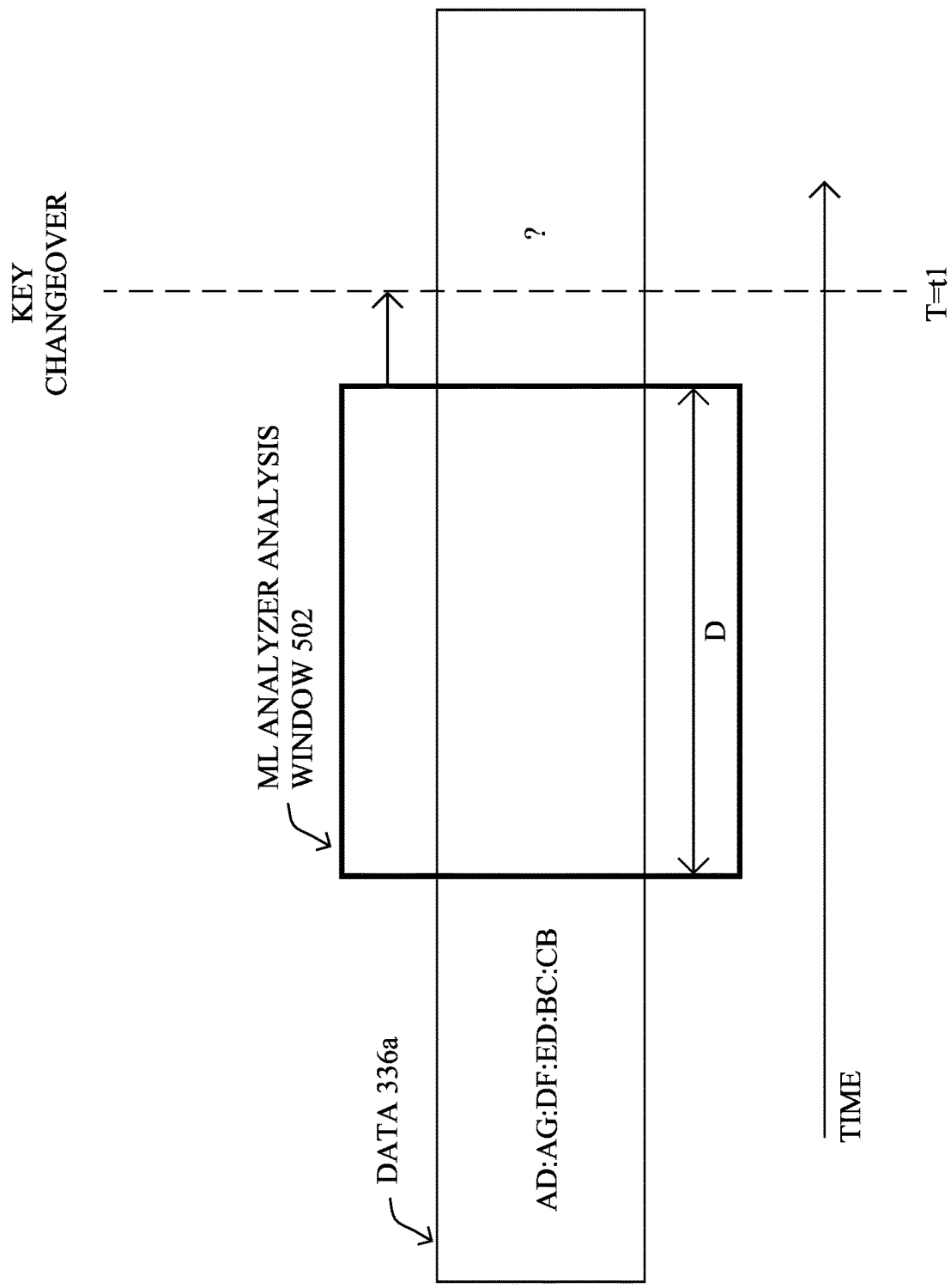

To illustrate the effects of an anonymization key changeover on the telemetry data reported to the network assurance service, FIGS. 5A-5C illustrate simplified examples of this telemetry data. As shown in FIG. 5A, assume that telemetry data 334 collected at time T=t0 includes MAC address 504 (e.g., AA:AA:AA:AA:AA:AA) and measured characteristics 506 regarding the device with MAC address 504 (e.g., onboarding time, DHCP information, etc.). During anonymization of data 334 into anonymized data 336a, MAC address 504 may be encrypted using an anonymization key to form MAC address 504a (e.g., AD:AG:DF:ED:BC:CB). In addition, tokens in characteristics 506 may also be anonymized (e.g., traffic destination address, etc.) as characteristics 506a.

In FIG. 5B, assume now that a key change takes place at time T=t1. As a result, tokens in data 334 will be encrypted differently than in FIG. 5B, resulting in anonymized data 336b. Notably, MAC address 504 may now be encrypted as DD:BB:CC:FF:AA:EE instead of AD:AG:DF:ED:BC:CB in anonymized data 336b. Similarly, any tokens in characteristics 506 may also be encrypted differently, resulting in characteristics 506b.

FIG. 5C illustrates the effect of an anonymization key changeover on a machine learning pipeline. As shown, assume that the network assurance service receives anonymized data 336a over the course of time. From the perspective of the service, the network entity under scrutiny is identified by AD:AG:DF:ED:BC:CB, the encrypted form of its true MAC address, AA:AA:AA:AA:AA:AA. Modeling of the behavior of the entity may entail the machine learning (ML) analyzer of the service looking at a sliding analysis window 502 of the incoming data 336a. In particular, the service may continually update the behavioral model over time using a history of the behavior that spans a time period D. If the current behavior then deviates from this modeled behavior by a threshold amount, this may indicate the presence of a behavioral anomaly.

When an anonymization key changeover takes place, such as at time T=t1, the MAC address is now encrypted as DD:BB:CC:FF:AA:EE instead of AD:AG:DF:ED:BC:CB. This means that the network assurance service will falsely believe that the device represented by AD:AG:DF:ED:BC:CB is no longer active in the monitored network. While it may be possible for the service to begin modeling the behavior of the "new" device that has identifier DD:BB:CC:FF:AA:EE, doing so also requires the service to first build at least a history of the device's behavior over a time period D. In many cases, D may be on the order of weeks or even months, meaning that the service will no longer actively assess the behavior of the underlying device until the model is recreated.

Unfortunately, anonymization key rotation may be required under a number of different circumstances, which may include the following:

The on-premises encryption key is likely to have been compromised. This is a higher criticality situation which requires the encryption key to be rotated immediately.

The on-premises encryption key may have been compromised. In this case, the encryption key may be changed out of precaution.

The on-premises encryption key is not assumed to be have been compromised, but the key is still rotated periodically, out of precaution. This is a common requirement for keys and passwords, and is sometimes required as part of formal certifications. For instance, an old backup containing the encryption key may leak, or someone who managed to gather some of the encrypted data may attempt to brute force the encryption key over the course of months, leveraging known-plaintext or similar attacks. Limiting the validity of an encryption key allows for the partial mitigation of such oversights which could result in compromise. Of the three situations, this is by far the most common and the least acceptable situation to relearn the device behaviors from scratch.

The above situations represent three different levels of criticality, depending on the strength of the belief that an attacker may be in possession of the encryption key used to anonymize the reported telemetry data from the monitored network. In the first situation where the key is considered very likely to have been compromised, or is known to be compromised, there are not a lot of secure options. To maintain the confidentiality of already collected data, the service 302 should cut off access to any previously sent data 336, so that the attacker cannot access this information. In addition, to maintain the confidentiality of future data, a new key should be generated by network data collection platform 304, and the cloud pipelines should restart from scratch as if it were a new network monitored by service 302. Exchanging any information on how to map entities 404 encrypted with the previous key to entities 404 encrypted with the new key is unsafe under the assumption that an attacker has the previous key.

The techniques herein are primarily aimed at the latter two scenarios above whereby the anonymization key changeover is of either medium or low criticality and security can be traded off for better quality of service. Although the techniques are not limited as such and can also be used in cases of high criticality, the security/service tradeoff may not be preferable to the network operator. Although no mechanism is secure if the anonymization key is compromised, the operator of the monitored network can elect to accept limited amount of risk for the sake of not interrupting the normal operations of service 302. In addition, the precautionary benefits of key rotation are still there (e.g., mitigate leaks of older data, backups or long-running cryptographic attacks).

According to various embodiments, the techniques introduce mechanisms that operate as part of the data ingestion pipeline of a network assurance service, meaning that the machine learning or analytics pipelines of the service do not require modification. In addition, the techniques herein do not require the sending of duplicate streams of data anonymized with the different keys, which is typically unacceptable from both a bandwidth and resource perspective.

One key component of the techniques herein is encryption module 408 that is located on-premise in the monitored network, typically as part of network data collection platform 304. During execution, encryption module 408 is responsible for generating an encryption key and using the key to anonymize data 334 into anonymized data 336 (e.g., by encrypting the tokens of data 334).

In various embodiments, whenever a user manually triggers a key rotation, such as via user interface 412, or when a periodic key rotation is to take place, encryption module 408 may enter into a "key rotation mode" and perform any or all of the following:

Generate a new encryption key for anonymizing data 334. In some cases, encryption module 408 may do so while keeping the user in the loop via user interface 412, so as to allow the key to be properly and safely backed up for disaster recover.

In the manual key rotation case, encryption module 408 may prompt the user via user interface 412 for a maximum duration in which to complete the rotation, referred to herein as a key rotation time period. The user can then select, via user interface 412, anything from "immediately," which comes with a loss of continuity in monitoring, to a maximum duration set by the system (e.g., a couple of weeks). Alternatively, the key rotation time period may be set by the system internally, such as in the case of periodic key rotations, and/or may not exposed to the user at all.

Encryption module 408 may also message cloud service 302, to notify service 302 that it has entered into key rotation mode. Such a message may also, in some embodiments, specify the key rotation time period to complete the rotation.

While in key rotation mode during the key rotation time period, encryption module 408 may immediately switch to sending anonymized data 336 to service 302 where tokens in the telemetry data are encrypted by encryption module 408 using the new encryption key.

In some embodiments, encryption module 408 may also maintain a list of all network entities 404 and/or clients 402 for which telemetry data was collected and encrypted. In turn, encryption module 408 may send a correspondence table to cloud service 302 that maps the tokens encrypted with the previous key to the tokens encrypted with the new key. For example, in the case illustrated in FIGS. 5A-5C, encryption module 408 may signal to cloud service 302 that encrypted MAC address AD:AG:DF:ED:BC:CB is now encrypted as MAC address DD:BB:CC:FF:AA:EE. Note that doing so still protects the true MAC address AA:AA:AA:AA:AA:AA from exposure to cloud service 302. To reduce the overhead, encryption module 408 may also provide only cumulative mapping updates to service 302 for the newly seen tokens since the previous update.

Although the above notification step does reduce security, somewhat, this may be an acceptable tradeoff, in many situations. To further protect the mappings sent from encryption module 408 to cloud service 302, traffic encryption techniques can also be leveraged, such as sending the mapping to service 302 via a secure tunnel and/or using traffic layer security (TLS) with proper mutual authentication. This traffic encryption is separate and distinct from that of the encryption/anonymization of the tokens in the collected telemetry data 334 and the two mechanisms should not be confused for one another. Note that encryption module 408 may also not need to send the correspondence table to service 302 as frequently as the main data stream of data 336 and the frequency can be selected as desired, to avoid consuming too much bandwidth and other resources. Of course, the frequency will depend on the actual implementation details of the cloud pipelines and can be selected, accordingly.

When the maximum duration for the key rotation time period is exceeded, encryption module 408 may discard the older encryption key and exit key rotation mode. In turn, encryption module 408 may continue sending only anonymized data 336 to cloud service 302, as intended in its normal mode of operation. One caveat to this approach is that any entities 404 or clients 402 that are not seen by encryption module 408 during the rotation period will lack a mapping to their new tokens in service 302.

In various embodiments, architecture 400 may also include a tokenizer 410 that may be executed, for example, as part of data mapper and normalizer 314. During operation, tokenizer 410 may be responsible for converting the tokens in live anonymized data 336 back to the older tokens, until analyzer 312 is ready to switch over to analysis of the new tokens. Whenever service 302 receives a notification from encryption module 408 that module 408 has entered into key rotation mode, tokenizer 410 may begin storing new data 336 anonymized with the new tokens as-is. In some cases, tokenizer 410 may store the new data 336 in a different memory location of service 302, to reflect that it is encrypted/anonymized using the new key.

When tokenizer 410 receives a correspondence table from encryption module 408, tokenizer 410 may also re-map the tokens encrypted with the new key in data 336 to the previously received data 336 anonymized using the old key, in various embodiments. Tokenizer 410 may do so by reading all of the data 336 received since the last correspondence table, or since the start of the key rotation time period, using the correspondence table to substitute the new tokens in data 336 with the old tokens, and storing the result in the previous location for data. In other words, tokenizer 410 may continue to augment the existing telemetry data with any newly received telemetry data, after converting the tokens in the new telemetry data over to the older tokens. In doing so, this allows the machine learning pipelines of analyzer 312 to continue to assess the performance of the monitored network, as normal.

In summary, the above procedure keeps growing a dataset using the older tokens, while data that exclusively uses the new tokens is accumulated on the side. In doing so, this eliminates the need for encryption module 408 to send duplicate telemetry data encrypted using both keys during the key rotation time period.

Figure 6A:
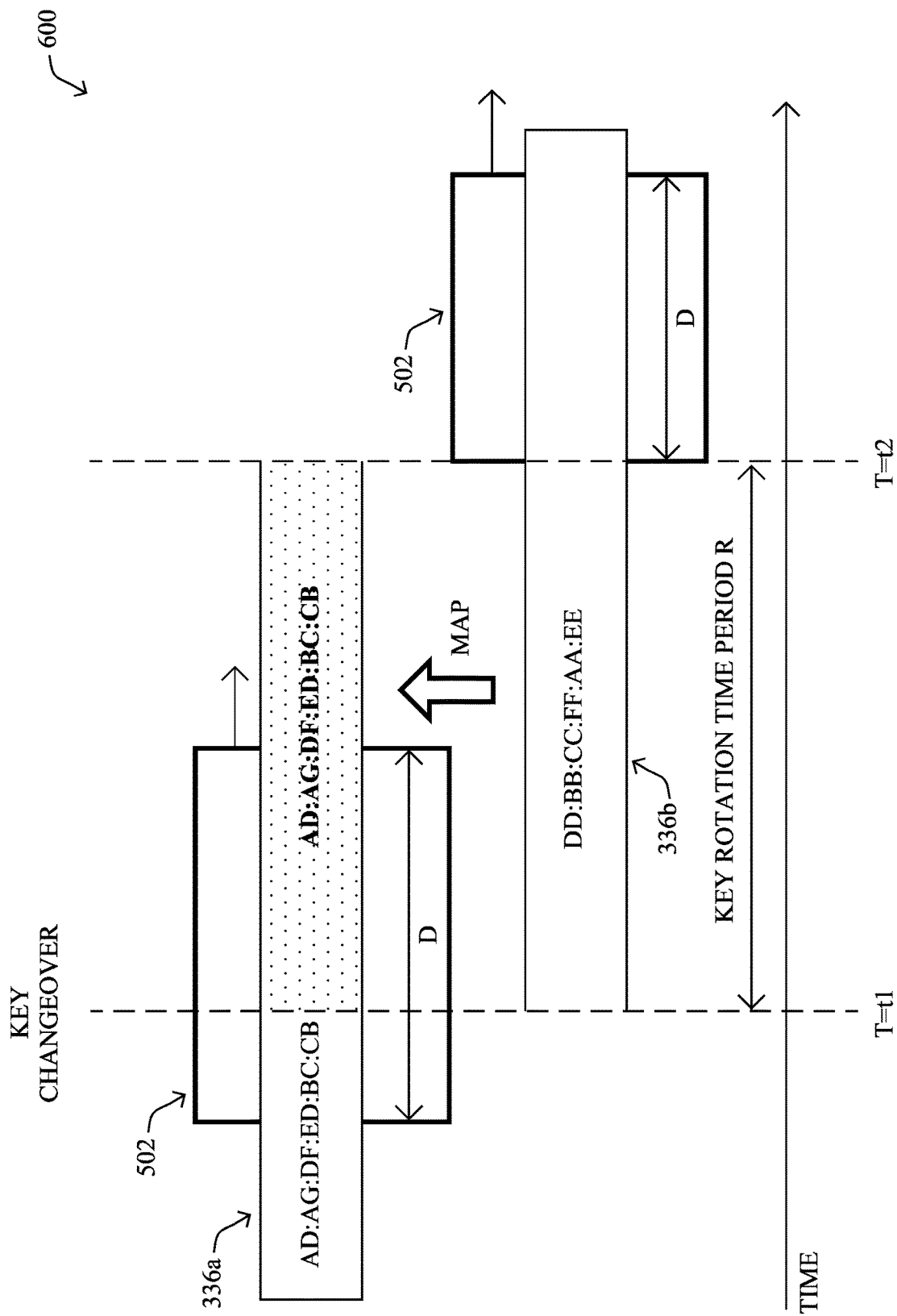
FIGS. 6A-6B illustrate examples of assessing anonymized telemetry data.

FIG. 6A illustrates an example 600 of the assessment of incoming telemetry data by service 302 that has been anonymized, in various embodiments. As shown, assume that anonymized data 336a described previously in FIG. 5A is sent over time to service 302 for analysis. At time T=t1, when a key changeover takes place, service 302 may no longer receive telemetry data that includes the token AD:AG:DF:ED:BC:CB and, instead, begin receiving data 336b with the anonymized token DD:BB:CC:FF:AA:EE.

To continue assessing the performance of the monitored network using its machine learning pipeline, tokenizer 410 of service 302 may receive a correspondence table from encryption module 408 that includes a mapping of the new token, DD:BB:CC:FF:AA:EE to the old token, AD:AG:DF:ED:BC:CB. In turn, during the key rotation period R, tokenizer 410 may replace the DD:BB:CC:FF:AA:EE token in data 336b with the AD:AG:DF:ED:BC:CB token and augment the dataset 336a with the new telemetry. In doing so, the machine learning and analytics pipelines that were previously assessing the behavior of AD:AG:DF:ED:BC:CB can continue to do so. For example, as shown, analysis window 502 can continue assessing the behavior during the key rotation time period using a mix of data 336a originally anonymized as AD:AG:DF:ED:BC:CB, as well as post-changeover data 336b whose tokens have been converted over to this format.

As noted above, service 302 may also store any post-changeover data 336b separately from the dataset maintained for data 336a. This allows service 302 to delete or otherwise make data 336a inaccessible after expiration of the key rotation time period R, in various embodiments. By doing so, even if the previous key were compromised, a malicious entity would not be able to obtain the original telemetry data from service 302.

Two possible cases exist with respect to the expiration of the key rotation time period R: 1.) the time span D of the analysis window 502 used by service 302 is smaller than, or equal to, the key rotation time period R and 2.) D is larger than R.

When D is smaller than R, switching over the machine learning and analysis pipelines of service 302 to using the new anonymized telemetry data 336 is relatively straight-forward. Notably, service 302 will have already accumulated a new dataset 336b with the new anonymized tokens that includes a history of measurements that exceeds D. In such a case, as illustrated in example 600 in FIG. 6A, service 302 may switch over its machine learning and analysis pipelines to analyzing the new dataset 336b with the new tokens, on expiration of the key rotation time period R. This frees up the initial dataset 336a with the old encrypted tokens for deletion or archiving, while also allowing the analysis processes of the service to continue uninterrupted.

Figure 6B:
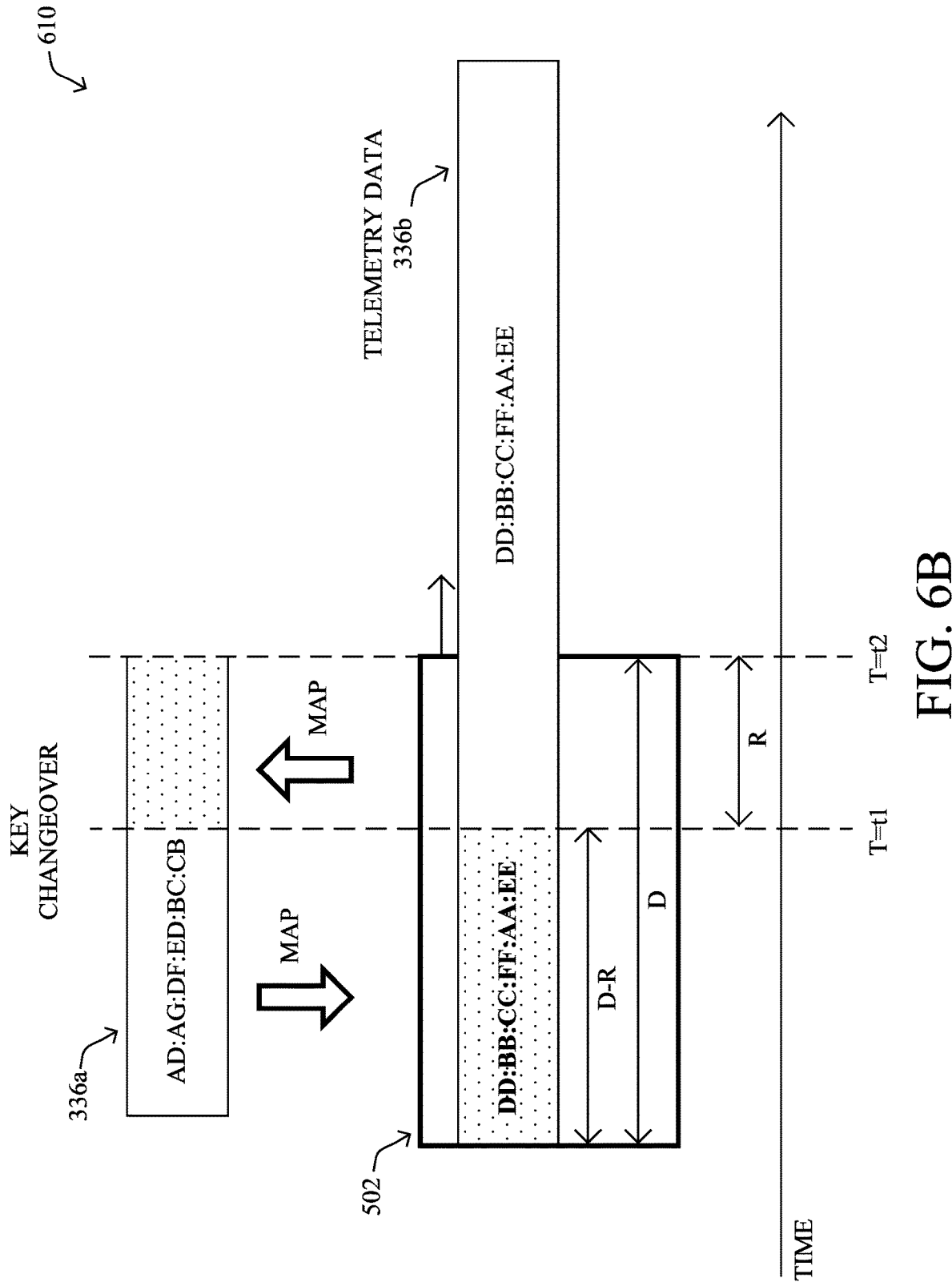

A more complex situation exists when D is greater than the key rotation time period R, as illustrated in the example 610 in FIG. 6B. As shown, assume that analysis window 510 requires a history of telemetry spanning a time period D that is larger than the key rotation time period R. For example, certain models may require a history of telemetry on the order of months, to function properly. In such cases, it would be impractical to extend the key rotation time period beyond this, as tokens anonymized using the old key would still be in use for months.

Accordingly, in various embodiments, tokenizer 410 may use the correspondence table from encryption module 408 to perform a reverse mapping whereby a history of telemetry data 336a under the old token is mapped to the new token. In turn, tokenizer 410 may augment the new dataset 336b under the new token, so as to fill in the required history for the machine learning and analysis pipelines to be switched over to the new dataset 336b on expiration of the key rotation time period R. During the key rotation time period R, service 302 may continue to analyze the original dataset 336a augmented with the mapped telemetry data 336b, in some embodiments. Alternatively, in further embodiments, service 302 may immediately switch over the pipeline to begin ingesting dataset 336b augmented with the necessary history of telemetry data from dataset 336a mapped to the new token. In either case, service 302 may make the dataset 336a inaccessible after expiration of key rotation time period R, such as by deleting dataset 336a.

Because the correspondence tables from the rotation period only cover entities seen during that duration, the tables may not contain all entities seen in the data in the (D-R) days coming up to the rotation. As such, tokenizer 410 may not be able to convert over the telemetry data for all entities 404 in the monitored network. Telemetry data for these entities may remain encrypted under the old token and remain as "ghost entities" to service 302. However, on more stable telemetry data streams, the impact will be limited.

Referring again to FIG. 4, encryption module 408 may also be configured to track the last K-number of entities 404 and/or clients 402 seen, where K is a suitably large value. In the event of a key rotation being triggered, encryption module 408 may immediately compute and send a correspondence table to service 302 for those K-number of devices. This will allow tokenizer 410 to get a better, more comprehensive table for the (D-R) period of time leading up to the rotation, further limiting the impact on the monitoring.

As would be appreciated, the techniques herein do not require any real modification to the machine learning and analysis pipelines of service 302 and, instead, consist in adjusting the telemetry data collection and ingestion mechanisms of the system.

Figure 7:
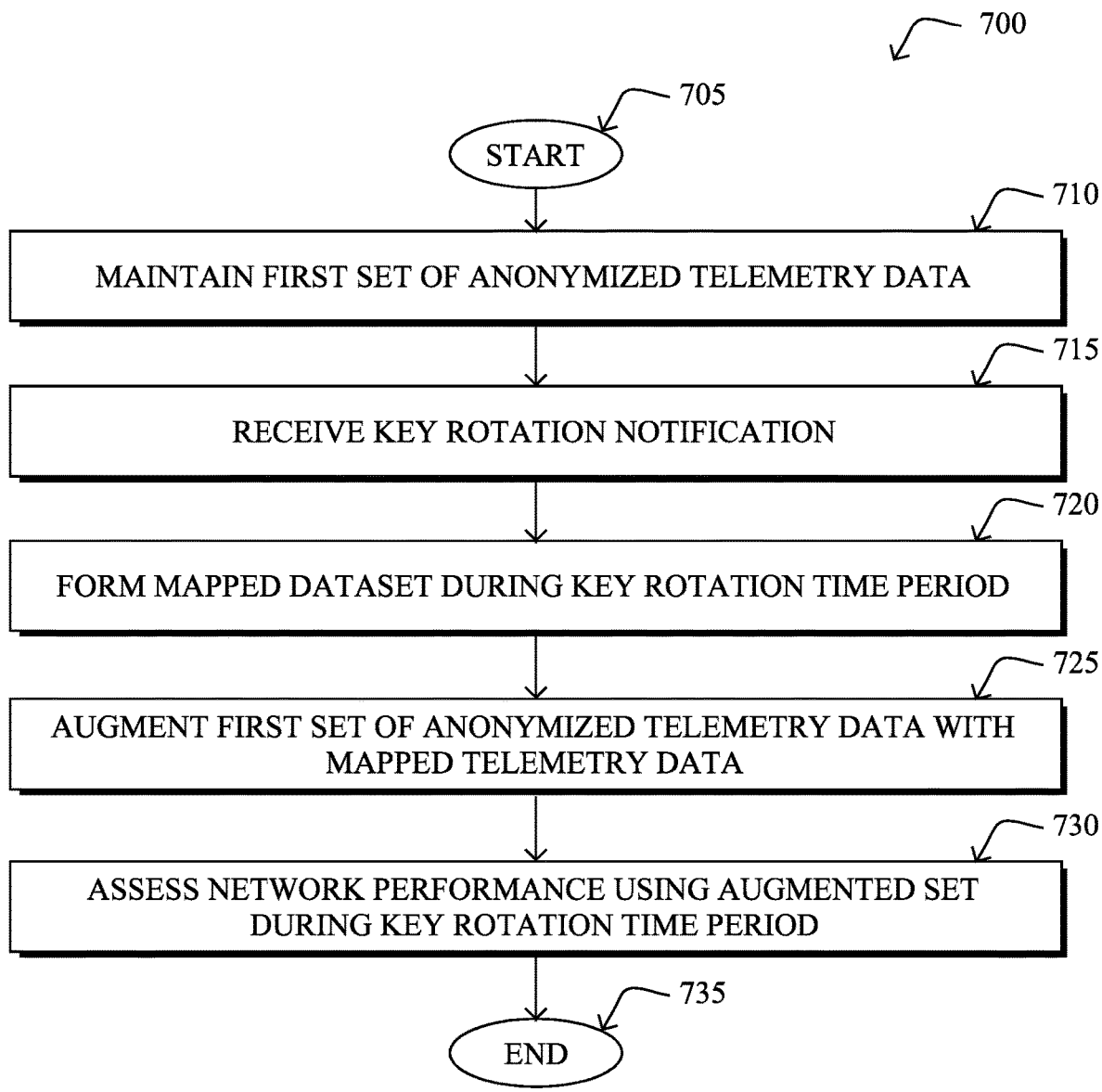
FIG. 7 illustrates an example simplified procedure for performing seamless key rotation in a network assurance system.

FIG. 7 illustrates an example simplified procedure for performing seamless key rotation in a network assurance system, in accordance with one or more embodiments described herein. For example, a non-generic, specifically configured device (e.g., device 200) may perform procedure 700 by executing stored instructions (e.g., process 248), to provide a network assurance service to a monitored network. The procedure 700 may start at step 705, and continues to step 710, where, as described in greater detail above, the network assurance service may maintain a first set of telemetry data from the network anonymized using a first key regarding a plurality of network entities in the network. In various embodiments, the network assurance service may apply a machine learning-based model to the first set of telemetry data to assess performance of the network. For example, in the case of anomaly detection, the service may use the first set of telemetry data as input to an unsupervised learning-based anomaly detection model, to determine whether the current behavior of a network entity has deviated from its prior behaviors by a threshold amount.

At step 715, as detailed above, the network assurance service may receive a key rotation notification indicative of a key changeover from the first key to a second key for anonymization of a second set of telemetry data from the network. In some embodiments, the service may receive the indication via a user interface. For example, a user may specifically request a key changeover to the encryption/anonymization mechanism in the monitored network which, in turn, notifies the network assurance service of the changeover. In other embodiments, the changeover may be scheduled periodically. The notification may also, in some cases, identify the key rotation time period, if the time period is not already pre-set or otherwise known by the service. At expiration of the time period, the service may delete or otherwise make the first set of telemetry data unavailable for access, thereby preventing misuse of the prior key by a malicious actor.

At step 720, the network assurance service may form, during the key rotation time period associated with the key changeover, a mapped dataset, as described in greater detail above. In particular, the service may do so by converting anonymized tokens in the second set of telemetry data into anonymized tokens in the first set of telemetry data. Such tokens in the telemetry data may be identifiers (e.g., IP addresses, MAC addresses, user IDs, etc.) that have been encrypted using an encryption key, so as to conceal the true identity of the entity in the telemetry data sent externally from the monitored network. To perform the mapping, the network assurance service may leverage one or more correspondence tables received from the monitored network that includes a mapping of the old tokens to the new tokens.

At step 725, as detailed above, the network assurance service may augment, during the key rotation time period, the first set of telemetry data with the mapped dataset. In particular, the service may continue to add entries to the telemetry data that uses the older token(s) that are mapped over from the new telemetry data with the tokens anonymized using the new encryption key.

At step 730, the network assurance service may assess, during the key rotation time period, performance of the network by applying the machine learning-based model to the first set of telemetry data augmented with the mapped dataset, as described in greater detail above. In doing so, the model can continue to assess the behavior of a device in the monitored network, even after its identifier has been switched over to a different anonymized token. On expiration of the key rotation time period, the service may then delete or otherwise make the dataset with the older tokens inaccessible. In addition, on expiration of the key rotation time period, the service may switch over to using the second dataset with the new tokens as input to the model. If the model requires a greater history of telemetry than available from the key rotation time period, the service may perform a reverse mapping to effectively backfill the new dataset with mapped entries from the first dataset (e.g., by mapping entries with the older tokens to entries with the new tokens). Procedure 700 then ends at step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce mechanisms that allow for the rotation of encryption keys used to anonymize telemetry data sent to a network assurance service by a monitored network, without interruption of the monitoring processes of the service. Doing so provides for a tradeoff between security and monitoring functions, which may be well suited for all but the most critical key rotations.

While there have been shown and described illustrative embodiments that provide for the seamless rotation of keys for data analytics and machine learning on encrypted data, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   maintaining, by a network assurance service that monitors a network, a first set of telemetry data from the network anonymized using a first key regarding a plurality of network entities in the network, wherein the network assurance service applies a machine learning-based model to the first set of telemetry data to assess performance of the network;
   receiving, at the network assurance service, a key rotation notification indicative of a key changeover from the first key to a second key for anonymization of a second set of telemetry data from the network;
   forming, by the network assurance service and during a key rotation time period associated with the key changeover, a mapped dataset by converting anonymized tokens in the second set of telemetry data into anonymized tokens in the first set of telemetry data;
   augmenting, by the network assurance service and during the key rotation time period, the first set of telemetry data with the mapped dataset; and
   assessing, by the network assurance service and during the key rotation time period, performance of the network by applying the machine learning-based model to the first set of telemetry data augmented with the mapped dataset.

2. The method as in claim 1, wherein the anonymized tokens in the first and second sets of telemetry data comprise at least one of: anonymized Internet Protocol (IP) addresses or anonymized media access control (MAC) addresses of the network entities.

3. The method as in claim 1, wherein the network entities comprise one or more of: a router, a switch, a wireless access point, or a wireless access point controller.

4. The method as in claim 1, further comprising:
   receiving, at the network assurance service, the key rotation notification via a user interface, wherein the key rotation notification further indicates the key rotation time period.

5. The method as in claim 1, further comprising:
   deleting, by the network assurance service, the augmented first set of telemetry data on expiration of the key rotation time period.

6. The method as in claim 1, further comprising:
   assessing, by the network assurance service and after expiration of the key rotation time period, performance of the network by applying the machine learning-based model to the second set of telemetry data.

7. The method as in claim 1, further comprising:
   augmenting, by the network assurance service, the second set of telemetry data with a portion of the first set of telemetry data, wherein the anonymized tokens in the portion of the first set of telemetry data used to augment the second set of telemetry data are converted into the anonymized tokens in the second set of telemetry data; and
   assessing, by the network assurance service, performance of the network by applying the machine learning-based model to the augmented second set of telemetry data.

8. The method as in claim 1, wherein the machine learning-based model comprises an unsupervised learning-based anomaly detection model.

9. The method as in claim 1, wherein the network assurance service uses a mapping received from the network to convert the anonymized tokens in the second set of telemetry data into anonymized tokens in the first set of telemetry data, wherein the mapping maps tokens anonymized using the first key to tokens anonymized using the second key.

10. The method as in claim 1, wherein the network assurance service is a cloud-based service that is remote from the monitored network.

11. An apparatus, comprising:
    one or more network interfaces;
    a processor coupled to the network interfaces and configured to execute one or more processes; and
    a memory configured to store a process executable by the processor, the process when executed configured to:
       maintain a first set of telemetry data from a monitored network anonymized using a first key regarding a plurality of network entities in the network, wherein the apparatus applies a machine learning-based model to the first set of telemetry data to assess performance of the network;

receive a key rotation notification indicative of a key changeover from the first key to a second key for anonymization of a second set of telemetry data from the network;

form, during a key rotation time period associated with the key changeover, a mapped dataset by converting anonymized tokens in the second set of telemetry data into anonymized tokens in the first set of telemetry data;

augment, during the key rotation time period, the first set of telemetry data with the mapped dataset; and assess, during the key rotation time period, performance of the network by applying the machine learning-based model to the first set of telemetry data augmented with the mapped dataset.

12. The apparatus as in claim 11, wherein the anonymized tokens in the first and second sets of telemetry data comprise at least one of: anonymized Internet Protocol (IP) addresses or anonymized media access control (MAC) addresses of the network entities.

13. The apparatus as in claim 11, wherein the network entities comprise one or more of: a router, a switch, a wireless access point, or a wireless access point controller.

14. The apparatus as in claim 11, wherein the process when executed is further configured to:

receive the key rotation notification via a user interface, wherein the key rotation notification further indicates the key rotation time period.

15. The apparatus as in claim 11, wherein the process when executed is further configured to:

delete the augmented first set of telemetry data on expiration of the key rotation time period.

16. The apparatus as in claim 11, wherein the process when executed is further configured to:

assess, after expiration of the key rotation time period, performance of the network by applying the machine learning-based model to the second set of telemetry data.

17. The apparatus as in claim 11, wherein the process when executed is further configured to:

augment the second set of telemetry data with a portion of the first set of telemetry data, wherein the anonymized tokens in the portion of the first set of telemetry data used to augment the second set of telemetry data are converted into the anonymized tokens in the second set of telemetry data; and assess performance of the network by applying the machine learning-based model to the augmented second set of telemetry data.

18. The apparatus as in claim 11, wherein the machine learning-based model comprises an unsupervised learning-based anomaly detection model.

19. The apparatus as in claim 11, wherein the apparatus uses a mapping received from the network to convert the anonymized tokens in the second set of telemetry data into anonymized tokens in the first set of telemetry data, wherein the mapping maps tokens anonymized using the first key to tokens anonymized using the second key.

20. A tangible, non-transitory, computer-readable medium storing program instructions that cause a network assurance service that monitors a network to execute a process comprising:

maintaining, by the network assurance service, a first set of telemetry data from the network anonymized using a first key regarding a plurality of network entities in the network, wherein the network assurance service applies a machine learning-based model to the first set of telemetry data to assess performance of the network;

receiving, at the network assurance service, a key rotation notification indicative of a key changeover from the first key to a second key for anonymization of a second set of telemetry data from the network;

forming, by the network assurance service and during a key rotation time period associated with the key changeover, a mapped dataset by converting anonymized tokens in the second set of telemetry data into anonymized tokens in the first set of telemetry data;

augmenting, by the network assurance service and during the key rotation time period, the first set of telemetry data with the mapped dataset; and assessing, by the network assurance service and during the key rotation time period, performance of the network by applying the machine learning-based model to the first set of telemetry data augmented with the mapped dataset.

* * * * *

UNITED STATES PATENT AND TRADEMARK OFFICE
CERTIFICATE OF CORRECTION

| | |
|---|---|
| PATENT NO. | : 11,212,079 B2 |
| APPLICATION NO. | : 16/186662 |
| DATED | : December 28, 2021 |
| INVENTOR(S) | : Savalle et al. |

Page 1 of 1

It is certified that error appears in the above-identified patent and that said Letters Patent is hereby corrected as shown below:

In the Specification

Column 6, Line 14, please replace with the following:
wireless AP controller may send a reason_code to the Column 7, Line 50, please replace with the following:
AP1 through nth access point, APn) through which endpoint Column 7, Line 65, please replace with the following:
AP1 through nth access point APm) that provide connectiv- Signed and Sealed this
Fifteenth Day of March, 2022

Drew Hirshfeld
*Performing the Functions and Duties of the
Under Secretary of Commerce for Intellectual Property and
Director of the United States Patent and Trademark Office*